United States Patent [19]
Jacobi et al.

[11] Patent Number: 5,315,868
[45] Date of Patent: May 31, 1994

[54] SENSOR FOR DETECTING THE INFLUENCE OF CROSS WIND ON A VEHICLE

[75] Inventors: Stefan Jacobi, Sindelfingen; Volker Berkefeld, Renningen, both of Fed. Rep. of Germany

[73] Assignee: Ing. H.C.F. Porsche AG, Fed. Rep. of Germany

[21] Appl. No.: 933,200

[22] Filed: Aug. 20, 1992

[30] Foreign Application Priority Data

Aug. 22, 1991 [DE] Fed. Rep. of Germany ....... 4127726

[51] Int. Cl.⁵ ............................................. G01C 21/00
[52] U.S. Cl. ................................. 73/178 R; 364/558
[58] Field of Search .................. 73/178 R, 147, 180; 364/558; 340/973

[56] References Cited

U.S. PATENT DOCUMENTS

| | | | |
|---|---|---|---|
| 4,987,542 | 1/1991 | Tran | 364/424.05 |
| 5,119,673 | 6/1992 | Tran et al. | 73/182 X |

FOREIGN PATENT DOCUMENTS

| | | |
|---|---|---|
| 1108091 | 5/1961 | Fed. Rep. of Germany . |
| 3816057 | 4/1989 | Fed. Rep. of Germany . |
| 0408886A2 | 6/1990 | Fed. Rep. of Germany . |

OTHER PUBLICATIONS

Patent Abstracts of Japan, Publication No. JP61077766, Apr. 21, 1986; Application No. JP840200946, Application Date: Sep. 25, 1984.
Patent Abstracts of Japan, Publication No. JP1075983, Mar. 22, 1989, Application No. JP870232439, Application Date: Sep. 18, 1987.

*Primary Examiner*—Richard E. Chilcot, Jr.
*Assistant Examiner*—Joseph L. Felber
*Attorney, Agent, or Firm*—Evenson, McKeown, Edwards & Lenahan

[57] ABSTRACT

A sensor arrangement for detecting the influence of cross wind on the handling of a motor vehicle comprising pressure measuring points situated on opposite sides of the vehicle for the measuring of the air pressure existing in the area of the outer skin of the vehicle body. The pressure measuring points are constructed as bores in the outer skin of the vehicle body. A differential pressure sensor, which detects the differential pressure ($D_p$) between two vehicle sides, is arranged centrally between two pressure measuring points, and is connected with the two bores by way of hoses or lines which, if possible, should have the same length. For detecting the vehicle's entry into and emergence from a cross wind gust, the sensor filters the detected values of the wind cross force by means of a low pass filter and compares them with the filtered values that were detected immediately before. When the difference between the amounts of the filtered values rises, entry into a cross wind gust is recognized, and when the values fall, emergence form a cross wind gust is recognized.

26 Claims, 2 Drawing Sheets

SENSOR FOR DETECTING THE INFLUENCE OF CROSS WIND ON A VEHICLE

BACKGROUND AND SUMMARY OF THE INVENTION

This invention relates to a sensor for detecting the of cross wind on a vehicle.

When driving through a gust of cross wind, a vehicle without steering correction is laterally displaced and turned out of the wind to at least some extent. As a result, the vehicle experiences a steady-state course deviation upon emerging from the gust, into an area which is free of cross winds. In addition to the wind force and the direction of the wind relative to the driving direction of the vehicle, the driving speed of the vehicle and its geometry influence the extent of the lateral displacement and change of direction, which therefore differ from one vehicle to the next.

As a rule, the influence of the cross-wind on a vehicle is taken into account in its construction, and is kept as low as possible by appropriate design measures. However, for physical reasons, it is not possible to eliminate completely the influence of cross wind on the vehicle handling by passive design measures alone.

It has therefore been attempted to further reduce the influence of cross winds on vehicle handling by the use of sensors to detect cross winds, with either an axle of the vehicle or the steering angle of the wheels of the axle being adjusted in a manner calculated to compensate for the effect of cross winds.

German Patent Document DE-PS 11 08 091 discloses an arrangement which operates in this manner. By way of one pressure measuring point situated respectively on each side of the vehicle, pneumatic pipes lead to chambers on both sides of a diaphragm of a pneumatic control element. The pneumatic control element actuates a hydraulic valve which controls a final control element. In a first embodiment, the final control element with a spring loaded center position, displaces the suspension points of an axle of the vehicle relative to the vehicle body; in a second embodiment, it adjusts the steering angle of the wheels of this axle.

However, in this known arrangement, the effect of the pressure difference on the steering angle is fixed in advance (largely proportional to the pressure difference), and therefore does not optimize the handling dynamics of the vehicle. Likewise, any disturbance in the approaching air has a direct effect on the steering angle.

In German Patent Document DE 38 16 057 C1, an arrangement is disclosed for determining the influences of cross winds on a vehicle. A total of six manometric capsules are arranged on the vehicle, whose pressure values are linked to one another in an expensive manner. Such linking of the pressure values requires relatively high computing expenditures. Since absolute pressure values are required, all sensors must be connected on one side with a reference pressure chamber which is itself connected with the atmosphere by way of a throttle line, in order to be able to use less expensive differential pressure sensors.

It is an object of the present invention to provide a sensor for detecting influences of cross winds on the handling of a vehicle, which by means of relatively low expenditures with respect to measurement techniques can determine the influence of the cross wind on the vehicle and is capable of generating a quantity which can easily be processed by means of control units connected to it.

This object is achieved by the detection arrangement according to the invention, which requires only a single differential pressure sensor for detecting the influence of the cross wind (that is, the transverse force of the wind) on the vehicle. The sensor is connected with two pressure measuring points on the vehicle body by way of hoses or lines which, if possible, should have the same length. The pressure measuring points are situated symmetrically with respect to the vertically extending longitudinal plane of the vehicle on its forward portion, for example, on the front fenders. They are placed in an area of the outer skin of the vehicle body which is free of turbulences and from which, even under unfavorable approach flow conditions, the flow does not separate. The sensor detects the vehicle's entry into or emergence from a gust of cross wind in that the detected values of the differential pressure are exponentially smoothed, and, from the respective difference of two successively detected values of the smoothed differential pressure, a rising or a falling of the differential pressure is determined.

The principal advantages of the invention are that a sensor for detecting the influences of cross wind on the vehicle is provided which requires only relatively low expenditures with respect to measurement techniques. In addition, the sensor generates easily processable output values which may, for example, by used in a control unit connected downstream for the control of a steering element of the vehicle as a function of the cross wind influence.

Other objects, advantages and novel features of the present invention will become apparent from the following detailed description of the invention when considered in conjunction with the accompanying drawings.

DETAILED DESCRIPTION OF THE DRAWINGS

Figure 1:
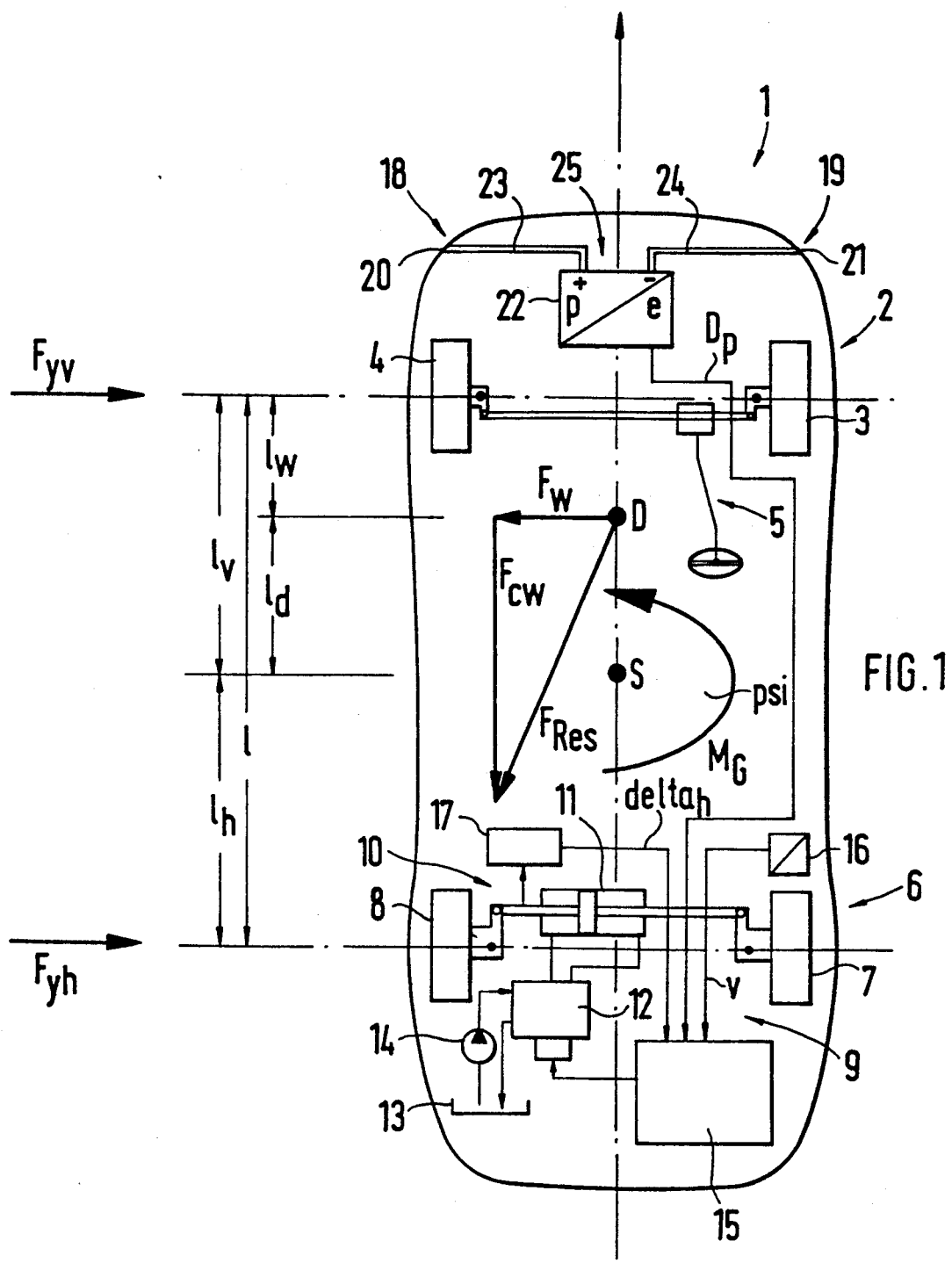
FIG. 1 is a schematic view of a vehicle which includes the sensor arrangement according to the invention.

In FIG. 1, reference number 1 indicates a two-axle vehicle whose front axle 2 or whose wheels 3, 4 can be steered arbitrarily by the vehicle driver by way of a first steering device 5. In a manner not required for the invention, a rear axle 6 of the vehicle 1 can be displaced with respect to the points of its linking to the body of the vehicle 1; the wheels 7, 8 of the rear axle can also be controlled in their steering angle (rear axle steering angle $\delta_h$) as a function of operating parameters 9 of the vehicle 1 by way of a second steering arrangement 10. For this purpose, the second steering arrangement 10 is equipped with a power-operated final control element 11 for adjusting a certain rear axle steering angle $\delta_h$. In the illustrated embodiment, the final control element 11 operates by means of a hydraulic power medium which is fed to the final control element 11, or removed into a storage vessel 13, by an electromagnetically actuated valve block 12. Finally, a pump 14 feeds hydraulic medium to the valve block 12 from the storage vessel 13.

A control unit 15, which preferably comprises a digital computer (microcomputer), controls the valve block 12 as a function of the operating parameters 9 of the vehicle 1, including, among other things, driving speed v of the vehicle detected by means of a driving speed sensor 16. For precise adjustment of the rear axle steering angle $\delta_h$, the control unit 15 may also have a regulating cascade control circuit, for the purpose of which the rear axle steering angle $\delta_h$ is detected by way of a rear axle steering angle generator 17 and is fed to the control unit 15.

To determine the influence of cross wind on vehicle handling, pressure measuring points 18 and 19 arranged on opposite sides of the vehicle 1, measure the air pressure in the area of the outer skin of the vehicle body. Pressure measuring points 18 and 19 are designed as bores 20 and 21. A differential pressure sensor 22, which detects the differential pressure Dp between both pressure measuring points 18, 19, is arranged centrally between the measuring points and is connected with them by means of hoses or pipes 23, 24 which should have the same length, if possible.

FIG. 1, shows a transverse cross force $F_W$ acting upon a pressure point D of the vehicle 1. (Any wind force acting on the vehicle may be resolved into vector components which are parallel and perpendicular to the longitudinal axis of the vehicle.) The transverse wind force $F_W$ points perpendicularly with respect to the longitudinal axis of the vehicle in the direction of the side of the vehicle facing away from the wind and can be calculated according to $$F_W = 0.5 * \rho * v_{Res}^2 * c_s A_f,$$ (Equation 1)

wherein:

$\rho$ atmospheric density, $v_{Res}$ approach velocity of the air, $c_s$ cross force coefficient of the aerodynamic drag of the vehicle, $A_f$ vehicle end face.

Tests have shown that, if the position of the pressure bores is selected properly, the transverse force $F_W$ of the wind is approximately proportional to the differential pressure Dp measured by the differential pressure sensor system 25.

Figure 2:
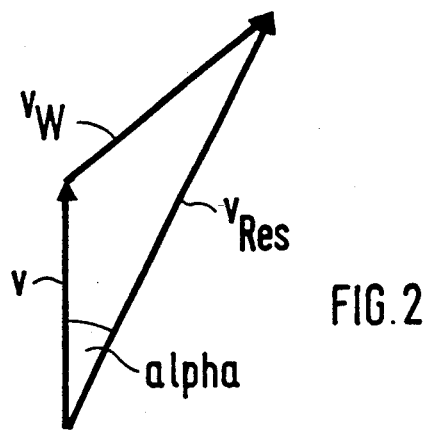
FIG. 2 is a vector diagram which shows a summation vector resulting from the wind velocity vector and the driving speed vector.

In the vector diagram according to FIG. 2, the side wind angle $\alpha$ is defined as the angle between the driving velocity vector v of the vehicle and the resulting summation vector $v_{Res}$ of the driving velocity vector v and the wind velocity vector $V_W$. If the transverse force $F_W$ of the wind is determined according to the above formula, the side wind angle $\alpha$ need not be known. However, in order to achieve good measuring results, the differential pressure sensor system 25 comprising the differential pressure sensor 22, the pressure measuring points 18, 19 the bores 20, 21, pipes 23, 24 and the control unit 15, should be arranged according to the following directions:

The pressure measuring points 18, 19 should be arranged symmetrically with respect to the vertically extending longitudinal plane of the vehicle on its forward portion, preferably on the left and right front fender (not shown).

The pressure measuring points 18, 19 should be arranged on the vehicle 1 in such a manner that, even in the case of large side wind angles $\alpha$ between the driving velocity vector of the vehicle and the summation vector $v_{Res}$ of the driving velocity vector v and the wind velocity vector $v_W$ according to FIG. 2, they are not situated in areas of separated air flow.

The pressure sensor system should be calibrated to sense pressure fluctuations occurring on the vehicle body surface in the area of the pressure measuring points 18, 19, in a frequency range of from 0 Hz to approximately 5 Hz, so that errors due to absorption, reflection and resonances are insignificant.

In simulation of a vehicle driving through a gust of cross wind, it was found that driving into a gust of cross wind and driving out of a gust of cross wind have different effects on the vehicle handling. Therefore, according to the invention, a computing circuit, which is connected to the differential pressure sensor and, in the present embodiment is incorporated in the control unit 15, utilizes values of the measured differential pressure Dp to distinguish the vehicle's entry into and emergence from a gust of cross wind, and generates a switching signal characterizing these conditions or corresponding decision conditions for further prompting.

To detect entry into or emergence from a gust of cross wind, the computing circuit in the control unit 15 filters the values of the computed transverse force $F_W$ of the wind or the detected values of the differential pressure Dp by means of a low-pass filter (filtered transverse force values $F_{Wf}$ of the wind), for example, corresponding to a PT-1-algorithm (exponential smoothing), and calculates the difference $DF_{Wf}$ between of the magnitudes of the filtered transverse forces of the wind determined at the present momentary point in time (computing pass k) and at the point in time of the last computation (computing pass k−1). That is:

$$DF_{Wf} = |F_{Wf,k}| - |F_{Wf,k-1}|$$

The computing circuit compares the difference $DF_{Wf}$ with a transverse-wind-force-dependent threshold value $-Schw*|F_{Wf,k-1}|$ and recognizes an entry into a gust of wind if the difference $DF_{Wf}$ of the filtered wind cross force values is larger than the transverse-wind-force-dependent threshold value: $DF_{Wf} > -Schw*|F_{Wf,k-1}|$. An emergence from a gust of cross wind is recognized if the difference $DF_{Wf}$ of the filtered wind cross force values is smaller than the transverse-wind-force-dependent threshold value: $DF_{Wf} < -Schw*|F_{Wf,k-1}|$. The low-pass filtering of the transverse wind force values $F_{Wf}$ preferably takes place by means of a cut-off frequency in the range of approximately 0.2 Hz.

By means of the transverse wind cross force values thus obtained, and the switching signal or the decision condition, for example, cross wind influence on the vehicle handling can be minimized.

Figure 3:
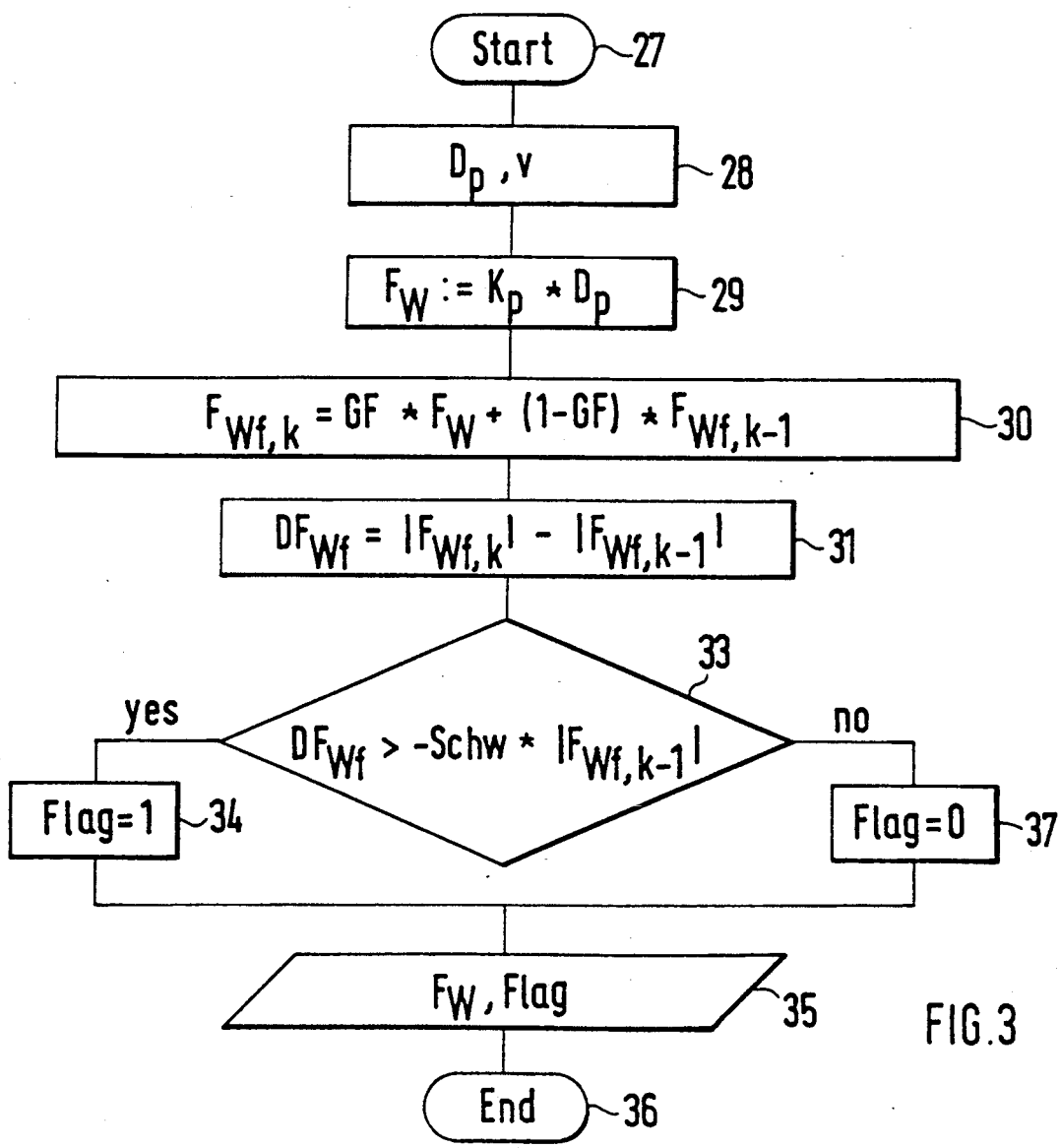
FIG. 3 is a flow chart for determination of a wind cross force.

FIG. 3 is a logic flow chart for determining the transverse wind force. On the basis of this flow chart, a corresponding subroutine may be established, and may be included, for example, in a control program for a rear axle steering.

After the program start, 27, the input values differential pressure Dp and driving speed v are first determined, 28. After determination of the transverse wind force $F_W$ from the differential pressure Dp and a proportion constant $K_p$, 29, the transverse wind force values $F_W$, by means of a $PT_1$-algorithm, are smoothed exponentially by a smoothing constant GF, 30, and the difference $DF_{Wf}$ is calculated, 31.

It is determined whether the difference of the transverse wind force values $DF_{Wf}$ is larger than the transverse-wind-force-dependent threshold value $-Schw*|F_{Wf,k-1}|$, 33. If so, entry into a cross wind gust is recognized and a switching signal (flag) is set: Flag=1, 34, the value of the detected wind cross force $F_W$ and of the flag is transmitted, 35, and the program is terminated, 36.

If condition 33 is not met, emergence of the vehicle from a cross wind gust is recognized, and the switching signal (flag) is set back: Flag=0, 37, and the continuation takes place by means of program step 35.

The exponential smoothing factor GF and the threshold factor are selected such that the condition of the flag will not change before there is a significant transverse wind force change which is larger than the one caused by high-frequency turbulences in wind gusts. The exponential smoothing factor GF determines the low-pass filter limit frequency $f_0$ and is calculated as follows:

$$GF = 1 - e^{(-2\pi * f_0 * DT)} \qquad \text{(Equation 2)}$$

wherein DT is the time interval between the (k−1)-th and the k-th computing step.

The simple and cost-effective sensor according to the invention therefore makes it possible to detect the influence of cross wind on a vehicle with sufficient precision so that the vehicle's entry into and emergence from a gust of cross wind can be recognized, allowing the two to be compensated differently with respect to the dynamics of vehicle movement. A simple conventional pressure transducer may be used as the differential pressure sensor 22.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Apparatus for detecting the influence of cross wind on the handling of a vehicle having a vehicle body, said apparatus comprising pressure measuring elements arranged on opposite sides of an outer skin of the vehicle body, wherein the pressure measuring elements are mounted on the outer skin of the vehicle body, and a differential pressure sensor, which detects a differential pressure between said opposite sides, is arranged centrally between said pressure measuring elements, said differential pressure sensor being connected with said pressure measuring elements by way of lines which have substantially the same length.

2. Apparatus for detecting the influence of cross wind on the handling of a vehicle having a vehicle body, said apparatus comprising pressure measuring elements arranged on opposite sides of an outer skin of the vehicle body, wherein the pressure measuring elements comprise as bores in the outer skin of the vehicle body, and a differential pressure sensor, which detects a differential pressure between said opposite sides, is arranged centrally between said pressure measuring elements, said differential pressure sensor being connected with said bores by way of lines, which have substantially the same length.

3. Apparatus according to claim 1, wherein the pressure measuring elements are arranged symmetrically with respect to a perpendicularly extending longitudinal plane of the vehicle, on its forward structure.

4. Apparatus according to claim 2, wherein the pressure measuring elements are arranged symmetrically with respect to a perpendicularly extending longitudinal plane of the vehicle, on its forward structure.

5. Apparatus according to claim 3, wherein the pressure measuring elements are arranged on the left and right front fenders of the vehicle.

6. Apparatus according to claim 4, wherein the pressure measuring elements are arranged on the left and right front fenders of the vehicle.

7. Apparatus according to claim 3, wherein the pressure measuring elements are arranged where they are not in areas of separated air flow, even in the case of large angles between a longitudinal axis of the vehicle and a summation vector of a driving speed vector and a wind velocity vector.

8. Apparatus according to claim 4, wherein the pressure measuring elements are arranged where they are not in areas of separated air flow, even in the case of large angles between a longitudinal axis of the vehicle and a summation vector of a driving speed vector and a wind velocity vector.

9. Apparatus according to claim 5, wherein the pressure measuring elements are arranged where they are not in areas of separated air flow, even in the case of large angles between a longitudinal axis of the vehicle and a summation vector of a driving speed vector and a wind velocity vector.

10. Apparatus according to claim 6, wherein the pressure measuring elements are arranged where they are not in areas of separated air flow, even in the case of large angles between a longitudinal axis of the vehicle and a summation vector of a driving speed vector and a wind velocity vector.

11. Apparatus according to claim 1, wherein said differential pressure sensor is calibrated to sense differential pressure fluctuations on the vehicle body surface in a frequency range of from 0 Hertz to approximately 5 Hertz, whereby errors due to absorption, reflection and resonances are minimized.

12. Apparatus according to claim 2, wherein said, differential pressure sensor is calibrated to sense differential pressure fluctuations on the vehicle body surface in a frequency range of from 0 Hertz to approximately 5 Hertz, whereby errors due to absorption, reflection and resonances are minimized.

13. Apparatus according to claim 3, wherein said differential pressure sensor is calibrated to sense pressure fluctuations on the vehicle body surface in a frequency range of from 0 Hertz to approximately 5 Hertz, whereby errors due to absorption, reflection and resonances are minimized.

14. Apparatus according to claim 4, wherein said differential pressure sensor is calibrated to sense pressure fluctuations on the vehicle body surface in a frequency range of from 0 Hertz to approximately 5 Hertz, whereby errors due to absorption, reflection and resonances are minimized.

15. An arrangement according to claim 1, wherein a signal taken from the differential pressure sensor and representing the differential pressure is converted into a transverse force acting upon the vehicle, by way of vehicle-type-dependent and pressure-bore-position-dependent correction values.

16. An arrangement according to claim 2, wherein a signal taken from the differential pressure sensor and representing the differential pressure is converted into a transverse force acting upon the vehicle, by way of vehicle-type-dependent and pressure-bore-position-dependent correction values.

17. An arrangement according to claim 3, wherein a signal taken from the differential pressure sensor and representing the differential pressure is converted into a transverse force acting upon the vehicle, by way of vehicle-type-dependent and pressure-bore-position-dependent correction values.

18. An arrangement according to claim 4, wherein a signal taken from the differential pressure sensor and representing the differential pressure is converted into a transverse force acting upon the vehicle, by way of vehicle-type-dependent and pressure-bore-position-dependent correction values.

19. Apparatus according to claim 1, wherein a computing circuit, is connected to the differential pressure sensor, and detects from the values of the measured differential pressure an increase or decrease of a gust of cross wind and transmits a switching signal as a function of said detected increase or decrease.

20. Apparatus according to claim 2, wherein a computing circuit, is connected to the differential pressure sensor, and detects from the values of the measured differential pressure an increase or decrease of a gust of cross wind and transmits a switching signal as a function of said detected increase or decrease.

21. Apparatus according to claim 3, wherein a computing circuit, is connected to the differential pressure sensor, and detects from the values of the measured differential pressure an increase or decrease of a gust, of cross wind and transmits a switching signal as a function of said detected increase or decrease.

22. Apparatus according to claim 4, wherein a computing circuit, is connected to the differential pressure sensor, and detects from the values of the measured differential pressure an increase or decrease of a gust of cross wind and transmits a switching signal as a function of said detected increase or decrease.

23. Apparatus according to claim 19 wherein, to detect the vehicle's entry into or emergence from a cross wind gust, the computing circuit comprises:
  a low pass filter which filters at least one of: computed values of the transverse wind force and detected values of the differential pressure;
  means for deriving a difference between filtered transverse wind force values determined at a particular point in time and at a point in time of an immediately preceding measurement of transverse wind force;
  means for comparing said difference with a transverse wind force dependent threshold value;
  means for recognizing an entry of the vehicle into a cross wind gust if the filtered transverse wind force value determined for said particular point in time is larger than the filtered transverse wind force value determined for said immediately preceding point in time, and
  means for recognizing an emergence of the vehicle from a cross wind gust if the filtered transverse wind force value determined for said particular point in time is smaller than the filtered transverse wind force value determined for said immediately preceding point in time.

24. Apparatus according to claim 21 wherein, to detect the vehicle's entry into or emergence from a cross wind gust, the computing circuit comprises:
  a low pass filter which filters at least one of: computed values of the transverse wind force and detected values of the differential pressure;
  means for deriving a difference between filtered transverse wind force values determined at a particular point in time and at a point in time of an immediately preceding measurement of transverse wind force;
  means for comparing said difference with a transverse wind force dependent threshold value;
  means for recognizing an entry of the vehicle into a cross wind gust if the filtered transverse wind force value determined for said particular point in time is larger than the filtered transverse wind force value determined for said immediately preceding point in time, and
  means for recognizing an emergence of the vehicle from a cross wind gust if the filtered transverse wind force value determent for said particular point in time is smaller than the filtered transverse wind force value determined for said immediately preceding point in time.

25. Apparatus according to claim 23, wherein said low pass filter has a critical frequency of approximately 0.2 Hz.

26. An arrangement according to claim 23, wherein said filtering is performed by exponential smoothing according to the formula: $F_{Wf,k} = GF^* F_W = (1 - GF)^* F_{Wf,k-1}$.

* * * * *